(12) United States Patent
Ishihara et al.

(10) Patent No.: US 8,498,047 B2
(45) Date of Patent: Jul. 30, 2013

(54) FILM MIRROR HAVING ULTRAVIOLET RAY REFLECTION FILM

(75) Inventors: Hideyuki Ishihara, Machida (JP); Nobuyoshi Mori, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 700 days.

(21) Appl. No.: 12/732,478

(22) Filed: Mar. 26, 2010

(65) Prior Publication Data

US 2010/0245991 A1 Sep. 30, 2010

(30) Foreign Application Priority Data

Mar. 31, 2009 (JP) ................................ 2009-084789

(51) Int. Cl.
*G02B 5/08* (2006.01)

(52) U.S. Cl.
USPC ............ 359/361; 359/360; 359/883; 359/884

(58) Field of Classification Search
USPC ................. 359/360, 361, 883, 884
See application file for complete search history.

(56) References Cited

U.S. PATENT DOCUMENTS

| | | | | |
|---|---|---|---|---|
| 4,189,205 A * | 2/1980 | Vandehei | ....................... | 359/360 |
| 4,307,150 A * | 12/1981 | Roche | ........................... | 428/336 |
| 4,645,714 A * | 2/1987 | Roche et al. | ................... | 428/458 |
| 4,714,308 A * | 12/1987 | Sawamura et al. | ............ | 359/360 |
| 5,118,540 A * | 6/1992 | Hutchison | ................... | 428/40.7 |
| 5,253,105 A * | 10/1993 | Paul et al. | ....................... | 359/359 |
| 5,361,172 A * | 11/1994 | Schissel et al. | ............... | 359/883 |
| 5,449,413 A | 9/1995 | Beauchamp | | |
| 6,078,425 A * | 6/2000 | Wolfe et al. | .................... | 359/584 |
| 6,310,905 B1 * | 10/2001 | Shirai | .............................. | 372/99 |
| 6,989,924 B1 * | 1/2006 | Jorgensen et al. | ............. | 359/361 |
| 7,206,125 B2 * | 4/2007 | Wang | ............................ | 359/361 |
| 7,612,937 B2 * | 11/2009 | Jorgensen et al. | ............. | 359/361 |
| 2003/0169425 A1 * | 9/2003 | Hendrix et al. | ................ | 356/445 |
| 2006/0261733 A1 | 11/2006 | Suzuki | | |
| 2010/0220389 A1 * | 9/2010 | Villuendas Yuste et al. | .. | 359/360 |
| 2010/0271694 A1 * | 10/2010 | Bamber | ........................ | 359/360 |
| 2012/0011850 A1 * | 1/2012 | Hebrink et al. | ............ | 60/641.15 |
| 2012/0257273 A1 * | 10/2012 | Murakami | ..................... | 359/361 |
| 2012/0268811 A1 * | 10/2012 | Kojima | ......................... | 359/360 |

FOREIGN PATENT DOCUMENTS

| | | |
|---|---|---|
| JP | 6-38860 | 2/1994 |
| JP | 07-058355 | 3/1995 |
| JP | 09-015407 | 1/1997 |
| JP | 2006-310728 | 11/2006 |
| JP | 2007-065232 | 3/2007 |

OTHER PUBLICATIONS

Office Action dated Sep. 24, 2012 in the corresponding Japanese Patent Application No. P2009-084789.

* cited by examiner

*Primary Examiner* — Mark Consilvio
(74) *Attorney, Agent, or Firm* — Cozen O'Connor (57) ABSTRACT

Disclosed is a film mirror used for reflection of sunlight, which includes, in the following order from the side where sunlight is entered, an ultraviolet ray reflection film which reflects ultraviolet ray and transmits visible and infrared light, a plastic film layer, a metal reflection-layer which reflects visible and infrared light, and a protective layer.

17 Claims, 1 Drawing Sheet

FILM MIRROR HAVING ULTRAVIOLET RAY REFLECTION FILM

Priority is claimed on Japanese Patent Application No. 2009-084789 filed on Mar. 31, 2009, in Japanese Patent Office, the entire content of which is hereby incorporated by reference.

TECHNICAL FIELD

The present invention relates to a film mirror which reflects sunlight.

BACKGROUND

In recent years, along with a growing interest in environmental issues, movement to try to utilize sunlight has become active. When utilizing sunlight, a mirror to reflect or condense sunlight is commonly used. Examples include a lighting mirror for shining sunlight on low-rise buildings on which sunlight is blocked by high-rise buildings, and a reflection mirror implemented in a light duct which is used to introduce sunlight into the interior of a building. The above mirrors are required to have functions such that they are light weight and unbreakable so that they are easy for treatment during delivery and installation, they can be made large and mass-produced in view of securing amount of lighting, they are flexible so that their shape can be agreed to shapes of installation places, and they are excellent in light-resistance and weather resistance in view of reflecting sunlight.

In general, as a commonly used mirror exhibiting high light reflectance, a glass mirror, in which a silver film is formed on one side of a transparent glass substrate by silver deposition, has been well known. However, since the glass mirror is apt to break to expose sharp edges, it always requires extreme caution in handling. Further, since the glass board with its thickness being extreme thin is hard to handle during the production process, it is required to have a certain degree of thickness. For this reason, in particular, for a large size product, the weight is significantly increased to require a special consideration during its delivery and installation.

For this reason, in consideration that there is danger of an injury due to breakage or difficulty in handling, it has been invented a mirror using a plastic resin board (for example, refer to Patent Document 1). The mirror described in Patent Document 1 is a plastic one in which a silver thin layer is formed on the surface of a transparent plastic resin in the form of plate or film. Since the substrate of the above plastic mirror is constituted of a plastic resin, it is possible for the plastic mirror to make it light weight and to reduce the production cost compared to a mirror whose substrate is constituted of a glass. Further, since the plastic resin is easy to be processed to a film shape, it is possible for the plastic resin to make it a highly flexible mirror.

PRIOR ART DOCUMENTS

[Patent Document]
Patent Document 1: JP-A H06-38860

SUMMARY

However, the plastic mirror described in Patent Document 1 is constituted of a back mirror in which light is transmitted through the plastic substrate and reflected at the silver layer. When the mirror is used for the purpose of reflecting sunlight, the plastic deteriorates and changes color to result in decrease in transmittance of light, which causes a problem of decrease in reflectance of the mirror.

Further, in view of obtaining high reflectance, as disclosed in Patent Document 1, it is preferable that the metal layer is constituted of silver exhibiting high reflectance in a visible light region. However, the silver has problems that it is inferior in weather resistance and likely to be deteriorated due to oxygen, moisture vapor, or sulfur. Coping with the problem, in Patent Document 1, it is assumed that the plastic substrate functions as a protective layer of a silver thin layer. However, as described above, plastic is likely to be deteriorated due to ultraviolet ray in sunlight, and deterioration of silver with an accompanying decrease in moistureproofing as a protective layer also causes a problem of decrease in reflectance of the mirror.

Further, in case where a mirror is used for the purpose of reflecting sunlight, the mirror is often used outside. In case where the mirror is used outside, the mirror is exposed to wind and rain. Under such a severe environment, the problem that the moistureproofing of plastic decreases along with deterioration of plastic due to ultraviolet ray in sunlight to result in deterioration of silver, in short, the problem of decrease in reflectance of a mirror accompanying deterioration of plastic, becomes a more significant one.

The present invention has been achieved in consideration of such problems, and it is an object of the invention to provide a film mirror which reflects sunlight and exhibits excellent light-resistance and weather resistance, which exhibits light weight and flexible, and makes it possible to make a large size mirror and to be mass-produced with a low production cost, as well as preventing plastic, which is a substrate of the mirror, from deterioration due to ultraviolet ray in sunlight.

The invention is described.

1. The film mirror used for reflection of sunlight of this invention comprises, in the following order from the side where sunlight is entered, an ultraviolet ray reflection film which reflects ultraviolet ray and transmits visible and infrared light, a plastic film layer, a metal reflection-layer which reflects visible and infrared light, and a protective layer.
2. The film mirror described in above item 1, wherein the thickness T of the above described plastic film layer is 10 $\mu m \leq T \leq 300$ $\mu m$, and preferably 20 $\mu m \leq T \leq 300$ $\mu m$, and in one embodiment of this invention 100 $\mu m \leq T \leq 300$ $\mu m$.
3. The film mirror as described in any one of above items 1 and 2, wherein the above described ultraviolet ray reflection film is constituted of dielectric multi-layers.
4. The film mirror as described in above item 3, wherein the above described dielectric multi-layers has a constitution that the above described dielectric multi-layers are laminated alternatively, in 4 layers or more and 6 layers or less, with a dielectric layer exhibiting a high refractive index and a dielectric layer exhibiting a low refractive index.
5. The film mirror as described in any one of above items 1 to 4, wherein the film mirror has a barrier layer between the above described ultraviolet ray reflection film and the above described plastic film layer, whose barrier layer exhibits oxygen transmittance of 0.01 ml/m$^2$/day/MPa or less, and moisture vapor transmittance of 0.001 g/m$^2$/day or less.
6. The film mirror as described in above item 5, wherein the ratio of the total thickness of the above described ultraviolet ray reflection film and the aforesaid barrier layer with respect to the thickness of the above described plastic film layer is 0.1 to 1.0%.

7. The film mirror as described in any one of above item Claims 1 to 6, wherein, between the above described ultraviolet ray reflection film which is constituted of dielectric multi-layers which are laminated alternatively, in 4 layers or more and 6 layers or less, with a dielectric layer exhibiting a high refractive index and a dielectric layer exhibiting a low refractive index, and the above described plastic layer, the film mirror has a barrier layer exhibiting oxygen transmittance of 0.01 ml/m$^2$/day/MPa or less and moisture vapor transmittance of 0.001 g/m$^2$/day or less, and, in addition, the aforesaid barrier layer doubles as the dielectric layer exhibiting a low refractive index of the aforesaid ultraviolet ray reflection film.

8. The film mirror as described in any one of above items 1 to 7, wherein, between the above described ultraviolet ray reflection film and the above described plastic layer, the film mirror has a barrier layer exhibiting oxygen transmittance of 0.01 ml/m$^2$/day/MPa or less, and moisture vapor transmittance of 0.001 g/m$^2$/day or less, and the above described ultraviolet ray reflection film and/or the aforesaid barrier layer are formed via an atmospheric pressure plasma polymerization method.

9. The film mirror as described in any one of above items 1 to 8, wherein, between the above described ultraviolet ray reflection film and the above described plastic layer, the film mirror has a barrier layer exhibiting oxygen transmittance of 0.01 ml/m$^2$/day/MPa or less and moisture vapor transmittance of 0.001 g/m$^2$/day or less, and the total τ of an internal stress of the above described ultraviolet ray reflection film and the aforesaid barrier layer is 0.1 MPa$\leq \tau \leq$3 MPa.

10. The film mirror as described in any one of above items 1 to 9, wherein the above described metal reflection-layer is constituted of silver.

11. The film mirror as described in any one of above items 1 to 10, wherein the film mirror is used outdoors.

According to the present invention, by arranging an ultraviolet ray reflection film on the light source side (for example on the side where sunlight is entered) of the plastic film layer, degradation or change of color of a plastic film layer by ultraviolet ray in sunlight can be prevented resulting in decrease in light transmittance of the plastic film layer being suppressed, therefore, it becomes possible to suppress decrease in reflectance of the film mirror. Further, decrease in moistureproofing of the plastic film layer originated in degradation of the plastic film layer due to ultraviolet ray in sunlight can also be reduced. For that reason, since degradation of the metal reflection-layer accompanying decrease in moistureproofing of the plastic film layer can also be prevented, it becomes possible to suppress the decrease in reflectance of the film mirror. Therefore, in case where the film mirror is used outdoors, it becomes possible to suppress the decrease in reflectance of the mirror due to the film mirror being exposed to ultraviolet ray in sunlight or wind and rain. Furthermore, each of layers or films is not necessarily contact with each other, but it may have other layer or film between the above layers or films.

In addition, since the film mirror of the present invention uses a plastic film for the mirror substrate, the film mirror is light weight compared to a film mirror in which glass is used for the mirror substrate. In addition, the above film mirror is not likely to be broken by impact, makes it easy for treatment during delivery and installation, and makes it possible to produce a large one.

Further, since the film mirror of the present invention is a film type so that a mirror can be very flexible to result in being freely bendable, it can be readily installed even on a curved or wavy surface of a wall. Further, since the film mirror is a film type so that it can be readily installed such as putting up a wall paper, it becomes possible to repaper the mirror readily.

According to the invention of Item 2, the thickness T of the plastic film layer is 10 μm$\leq$T$\leq$300 μm. When such a thin plastic film layer is used, the plastic film layer exhibits excellent flexibility. But when moistureproofing is degraded due to degradation of the plastic film layer by ultraviolet ray, the degradation rate of the moistureproofing becomes larger because of thinness of the plastic film layer to cause a problem that high reflectance thereof lasts for only a short period. However, by arranging the ultraviolet ray reflection film of the present invention, the high reflectance lasts for a long period in spite of the plastic film layer being very thin, and as a result the effect of the present invention becomes more significant.

According to the invention of Item 3, the ultraviolet ray reflection film is constituted of dielectric multi-layers. The above layer constitution can enhance bruise resistance of the ultraviolet ray reflection film, whereby it becomes possible to suppress the decrease in reflectance of ultraviolet ray due to bruise on the ultraviolet ray reflection film.

According to the invention of Item 4, the film mirror is constituted of dielectric multi-layers in which a dielectric layer exhibiting a high refractive index and a dielectric layer exhibiting a low refractive index are laminated alternatively in 4 layers or more and 6 layers or less. The above constitution makes it possible to combine high reflectance of ultraviolet ray by the ultraviolet ray reflection film, and high transmittance of visible and infrared light. The above constitution is also preferable in view of production cost.

According to the invention of Item 5, the film mirror has a barrier layer exhibiting oxygen transmittance of 0.01 ml/m$^2$/day/Mpa or less, and moisture vapor transmittance of 0.001 g/m$^2$/day or less, between the ultraviolet ray reflection film and the plastic film layer. The above barrier layer reduces the transmittance of oxygen or moisture vapor, which spreads from a surface of the light source side of the film mirror into the interior of the mirror, whereby it becomes possible to reduce degradation of the plastic film layer and the metal reflection-layer caused by oxygen or moisture vapor.

According to the invention of Item 6, the film mirror has a barrier layer exhibiting oxygen transmittance of 0.01 ml/m$^2$/day/MPa or less, and moisture vapor transmittance of 0.001 g/m$^2$/day or less, between the ultraviolet ray reflection film and the plastic film layer, and the ratio of the total thickness of the ultraviolet ray reflection film and the barrier layer with respect to the thickness of the plastic film layer is 0.1 to 1.00. In designing the plastic film mirror, the thickness of the ultraviolet ray reflection film is generally fixed first, and then, based on it, the thickness of the plastic film layer is fixed. In the designing, when the plastic film layer is designed to be thin, a warp or a film separation of the film mirror is caused due to an effect of an internal stress of the ultraviolet ray reflection film and the barrier layer. Coping with the above problems, the ratio of the total thickness of the ultraviolet ray reflection film and the barrier layer with respect to the thickness of the plastic film layer is designed to be 0.1 to 1.0%. Namely, by making the plastic film layer being thicker than the total thickness of the ultraviolet ray reflection film and the barrier layer, it becomes possible to suppress generation of a warp or a film separation of the film mirror caused by an internal stress of the ultraviolet ray reflection film and the barrier layer.

According to the invention of Item 7, the film mirror has a barrier layer exhibiting oxygen transmittance of 0.01 ml/m$^2$/day/MPa or less, and moisture vapor transmittance of 0.001 g/m$^2$/day or less, between an ultraviolet ray reflection film, which is constituted of dielectric multi-layers which are laminated alternatively, in 4 layers or more and 6 layers or less, with a dielectric layer exhibiting a high refractive index and a dielectric layer exhibiting a low refractive index, and the plastic layer, and, in addition, the barrier layer doubles as the low refractive index layer of the ultraviolet ray reflection film. With this constitution, because the barrier layer doubles as the dielectric layer exhibiting a low refractive index of the dielectric multi-layers, it becomes possible to simplify the constitution of the film mirror, whereby the mirror is readily produced.

According to the invention of Item 8, the film mirror has a barrier layer exhibiting oxygen transmittance of 0.01 ml/m$^2$/day/MPa or less, and moisture vapor transmittance of 0.001 g/m$^2$/day or less, between the ultraviolet ray reflection film and the plastic layer. The ultraviolet ray reflection film and/or the barrier layer are formed via an atmospheric pressure plasma polymerization method. By forming the ultraviolet ray reflection film or the barrier layer via an atmospheric pressure plasma polymerization method, an internal stress of the ultraviolet ray reflection film or the barrier layer can be made small compared to a case where it is formed via a vacuum sputtering method, whereby it becomes possible to suppress generation of a film separation of the ultraviolet ray reflection film or the barrier layer. Further, by suppressing the internal stress of the ultraviolet ray reflection film or the barrier layer, generation of a warp of the film mirror can be reduced.

According to the invention of Item 9, between the ultraviolet ray reflection film and the plastic layer, the film mirror has a barrier layer exhibiting oxygen transmittance of 0.01 ml/m$^2$/day/MPa or less, and moisture vapor transmittance of 0.001 g/m$^2$/day or less, and the total $\tau$ of an internal stress of the ultraviolet ray reflection film and the barrier layer is 0.1 MPa$\leq\tau\leq$3 MPa. With this, generation of a warp or a film separation of the film mirror can be suppressed.

According to the invention of Item 10, the metal reflection-layer is constituted of silver. On the one hand, in case where the metal reflection-layer is constituted of silver, very high reflectance can be ensured, on the other hand, the silver has problems that it is inferior in weather resistance and likely to be deteriorated due to oxygen, moisture vapor, or sulfur. However, by arranging the ultraviolet ray reflection film of the present invention, the high reflectance lasts for a long period in spite of the metal reflection-layer being constituted of silver, and as a result the effect of the present invention becomes more significant.

According to the invention of Item 11, the film mirror is used outdoors. With this use, since the film mirror can be more directly exposed to sunlight, compared to a case where the film mirror is used indoors, it becomes possible that the film mirror reflects sunlight more efficiently.

EMBODIMENTS FOR CARRYING OUT THE INVENTION

Embodiments of the present invention will be described hereinafter, but it should be understood that the present invention is not limited to them.

The film mirror relating to the present invention has an ultraviolet ray reflection film, a plastic film layer, a metal reflection-layer, and a protective layer. Further, the film mirror relating to the present invention is constituted so that the ultraviolet ray reflection film, the plastic film layer, the metal reflection-layer, and the protective layer are arranged in the above order from a light source side, but it may have other layers between each of the above films or layers. Moreover, it may have other layers on the light source side of the ultraviolet ray reflection film, and it may have other layers on the opposite side of the protective layer to the light source. The ultraviolet ray reflection film, the plastic film layer, the metal reflection-layer, and the protective layer will be described hereinafter.

[Ultraviolet Ray Reflection Film]

The ultraviolet ray reflection film is a film which reflects ultraviolet ray and transmits visible and infrared light. The ultraviolet ray reflection film preferably exhibits an average reflectance for electromagnetic wave of 320 to 400 nm (ultraviolet ray) of 75% or more. Further, the ultraviolet ray reflection film preferably exhibits an average transmittance for electromagnetic wave of 400 to 2,500 nm (visible and infrared light) of 80% or more. The ultraviolet ray reflection film is arranged on the light source side of the plastic film layer.

The film mirror relating to the present invention is disposed of a plastic film layer on the light source side of the metal reflection-layer, and since the film mirror reflects sunlight, which passed through the plastic film layer, at the metal reflection-layer, the plastic film layer is always exposed to sunlight. Therefore, arrangement of an ultraviolet ray reflection film on the light source side of the plastic film layer prevents the plastic film layer from degradation or color change due to ultraviolet ray, and then, suppresses decrease in light transmittance of the plastic film layer, whereby it becomes possible to suppress decrease in reflectance of the film mirror. Further, arrangement of an ultraviolet ray reflection film on the light source side of the plastic film layer can also suppresses decrease in moisture vapor proofing properties of the plastic film layer caused by degradation of the plastic film layer due to ultraviolet ray in sunlight. Therefore, since degradation of the metal reflection-layer accompanying degradation of moisture vapor proofing properties of the plastic film layer can also be prevented, it becomes possible to suppress decrease in reflectance of the film mirror.

As the ultraviolet ray reflection film, dielectric multi-layers, composed of alternating layers of more than two kinds of dielectric substance differing in refractive index, can be used, but are not limited to them. The dielectric multi-layers relating to the present invention are preferably constituted by laminating alternatively, in 4 layers or more and 6 layers or less, a dielectric layer exhibiting a high refractive index and a dielectric layer exhibiting a low refractive index. The multi-layer structure, in which the dielectric layers are laminated in such a way as described above, can enhance bruise resistance of the dielectric multi-layers. The refractive index of the dielectric layer exhibiting a high refractive index is preferably 2.0 to 2.6. In addition, the refractive index of the dielectric layer exhibiting a low refractive index is preferably 1.8 or less.

In the dielectric layers exhibiting high refractive indices, and in the dielectric layers exhibiting low refractive indices, $ZrO_2$ or $TiO_2$, and $SiO_2$ or $Al_2O_3$ can be preferably used, respectively. In the dielectric layers exhibiting high refractive indices, and in the dielectric layers exhibiting low refractive indices, both of which are used in the present invention, the $TiO_2$ and $SiO_2$ respectively can be more preferably used. In case where $TiO_2$ is used in the uppermost surface of the ultraviolet ray reflection film, namely in the uppermost surface of the film mirror, since a stain resistance effect of the mirror surface due to a photo-catalyst effect of $TiO_2$ can be secured, it becomes possible to suppress decrease in reflectance of the film mirror caused by stains on the mirror surface.

The thickness of each of the dielectric layers exhibiting high and low refractive indices used in the present invention is preferably designed so that an optical film thickness becomes λ/4 (nm), provided that a designed wavelength is λ, wherein 380 (nm) is preferably used as the designed wavelength. As described above, by laminating many layers of the dielectric layers exhibiting a high refractive index and a low refractive index with a thickness of ¼ of wavelength, a very high reflectance can be secured due to interference of reflected light at interfaces of the above dielectric layers. The thickness of the dielectric layer exhibiting a high refractive index is preferably 10 to 400 nm, and the thickness of the dielectric layer exhibiting a low refractive index is preferably 10 to 400 nm.

The dielectric multi-layers can be formed with means such as a vacuum moisture vapor deposition method, a sputtering method, an ion beam sputtering method, a CVD method, and an atmospheric pressure plasma polymerization method.

[Plastic Film Layer]

The plastic film layer of the present invention means that the layer is the substrate of the film mirror of the present invention, and is a layer constituted of plastic having a film shape. The plastic film layer is disposed between the ultraviolet ray reflection film and the metal reflection-layer.

For the plastic film layer, a film composed of various plastics can be used, which plastics include, for example, polyesters such as a polyethylene terephthalate (PET), a polyethylene naphthalate; polycarbonates such as a bisphenol A polycarbonate; polyolefins such as a polyethylene, a polypropylene, a cycloolefin polymer (COP); cellulose derivatives such as a cellulose triacetate; vinyl type resins such as a polyvinylidene chloride; polyimides, polyamides, a polyethersulfone, polysulfone type resins, polyarylate type resins, and fluorine type resins. But the above plastics are not necessarily limited to the above compounds, and any plastics, exhibiting a regular heatproof temperature being to some extent high, can be used. It is needless to say that when a plastic exhibiting a high heat resistance is used, a film mirror which can be used at a high temperature is obtained.

Among the above compounds, in particular, a polyethylene terephthalate (PET), and a cycloolefin polymer (COP) can be preferably used. Since the PET or the COP exhibits barrier properties against oxygen or moisture vapor, degradation of the metal reflection-layer due to oxygen or moisture vapor can be decreased. In particular, since the COP exhibits more excellent barrier properties against oxygen or moisture vapor than PET, the COP can be more preferably used as the plastic film layer.

The thickness of the plastic film is preferably about 100 μm to about 300 μm, and more preferably about 100 μm to about 150 μm.

[Metal Reflection-Layer]

The metal reflection-layer is a layer which is constituted of a metal which reflects visible and infrared light. The metal reflection-layer is disposed between a plastic film layer and a protective layer.

As the metal reflection-layer of the present invention, silver or aluminum can be used, but is not particularly limited to them. In particular, silver is preferably used. When silver is used, higher reflectance than aluminum with respect to light having wavelength of 380 nm or more can be secured.

In case where silver or aluminum is used for the metal reflection-layer, the silver or the aluminum is basically preferably a simple one. However, it may contain metal impurities such as gold, cupper, nickel, iron, cobalt, tungsten, molybdenum, tantalum, chromium, indium, manganese, titanium, and palladium, in such a quantity that the impurities cause no harm to properties of silver or aluminum.

In case where silver or aluminum is used for the metal reflection-layer, the thickness of the metal reflection-layer is preferably 70 to 400 nm, more preferably 100 to 300 nm, and further preferably 150 to 250 nm. In case where the thickness is thinner than 70 nm, since a sufficient metal layer is not formed, desired reflectance can not be secured. Even the thickness is made larger than 400 nm, there is not only no change in the effect, but it is not preferable in view of effective use of resources.

As the forming method of the metal reflection-layer of the present invention, either the wet method or the dry method can be used. The wet method is a general term of the plating method, and a method for forming a film by allowing metals to separate out from a solution. If a specific example of the wet method is listed, the silver mirror reaction is included. The dry method is a general term of vacuum film-forming method. The specific examples include, a resistance heating type vacuum deposition method, an electronic beam heating type vacuum deposition method, an ion-plating method, an ion beam assisted vacuum deposition method, and a sputtering method. Most of all, for the present invention, preferably used is the vacuum deposition method, in which a roll-to-roll method, a continuous film-forming method, can be applied.

[Protective Layer]

The protective layer of the present invention is a layer to provide resistance properties against water, various gases, acid, alkaline, and the like, according to the environment of usage of the film mirror. The protective layer is disposed on the back side of the metal reflection-layer (the reverse side of the light source side).

The protective layer of the present invention can be constituted of a resin, and may further contain a pigment, but is not particularly limited to them. Various resins can be used, but it is preferably constituted of an epoxy resin and a hardener.

The epoxy resin is preferably a resin exhibiting an epoxy equivalent of 160 to 3,300. The usable examples thereof include bis-phenol A type epoxy resins, bis-phenol F type epoxy resins, hydrogenated epoxy resins of the above resins, and alicyclic epoxy resins. Of these, bis-phenol type epoxy resins are preferably used. The resins can be suitably selected from commercially available resins, such as EPOMIC R301, R302, R304, and R307 (manufactured by Mitsui Chemicals Inc.), AER #661, #662, #664, #667, and #669 (manufactured by Asahi Kasei Chemicals Corp.), ADECA RESIN EP-5100, EP-5400, EP-5700, EP-5900, and EP-4100 (manufactured by Adeka Corp.), and EPICOTE 1001, 1002, 1004, 1007, 1009, 815, 825, and 828 (manufactured by Japan Epoxy Resin Co., Ltd.).

As the hardener of the epoxy resins, hardeners such as those of an amine type and an acid hydride, which are used for regular epoxy resins, can be used without any problem. Of these, the amine type hardener can be preferably used. Specific examples can be selected from hardeners such as an aromatic amine type, an aliphatic amine type, an amide polyamine type, and a polyamide type. Commercially available hardeners include TOHMIDE 410N, 215-70X, ST-23 (manufactured by Fuji Kasei Kogyo Co., Ltd.), DAITOCURAR HD-325, D-677, HD-801CB, M-1540, and P-4730 (manufactured by Daito Sangyo Co., Ltd.), SUNMIDE 153-60S, X-2700-49, X-2015, E-1001, ANQUAMINE 2143, 1618, and ANQUAMIDE 350A (manufactured by Air Products Japan Inc.)

Regarding a pigment, usable without any problem are pigments, which are generally used for a protective layer for the back of the mirror. For example, a body pigment, a coloring pigment, and a rust-preventive pigment can be compounded.

The body pigment can be selected from general pigments used for paints according to properties of pigment itself such as chemical resistance and thermal resistance, and can be selected from, for example, talc, barium sulfate, magnesium silicate, mica, kaolin, and calcium carbonate.

Coloring pigment can be selected from general pigments used for paints according to properties of pigment itself such as chemical resistance and thermal resistance, and can be selected from, for example, titanium oxide, carbon black, black iron oxide, ferric oxide, yellow ferric oxide, chlorinated phthalocyanine green, bromo-chlorinated phthalocyanine green, and phthalocyanine blue.

The rust-preventive pigment can be selected from general pigments used for paints according to properties of pigment itself such as chemical resistance and thermal resistance, without particular limitation as long as the pigment is a non-lead type. The specific pigment can be selected from compounds such as zinc oxide, zinc phosphate, zinc polyphosphate, calcium phosphate, calcium zinc phosphate, aluminum phosphate, magnesium phosphate, zinc phosphite, zinc molybdate, zinc calcium molybdate, calcium molybdate, zinc phosphomolybdate, calcium phosphomolybdate, aluminum phosphomolybdate, aluminum zinc phosphomolybdate, zinc cyanamide, zinc calcium cyanamide, and barium metaborate.

The epoxy resin content of a solid form in the protective layer is not particularly limited as long as the pigment volume density in the coated film is in the range of 5 to 15%. In case where the pigment volume density is less than 5%, the coated film becomes soft to result in being inferior in separation properties of a mirror. On the other hand, in case where the pigment volume density exceeds 15%, the coated film is likely to penetrate chemicals such as acid to result in decrease in chemical resistance such as acid resistance. Though the pigment volume density depends mainly on density of the pigments used, it is preferable that it is, in general, 55 to 70 weight percent, and the content of the pigments including the body pigment, the coloring pigment, and rust-preventive pigment is 20 to 40 weight percent. The blending quantity of the epoxy resin hardener is properly determined based on the kind of epoxy resin, the equivalent of epoxy, and the blending quantities of the epoxy resin, and is preferably 5 to 15 weight percent with respect to the solid content in the protective layer.

For the purpose of securing proper dispersibility of pigments and workability of coating, a solvent can be used in the protective layer to dissolve a binder or a hardener. As the above solvent, a proper quantity of commonly known solvents such as an aromatic or an aliphatic hydrocarbon type, an ester type, an ether type, a ketone type, an ester-ether type, and an alcohol type can be used. Further, it is needless to say that additives such as a dispersing agent, an antisettling agent, a defoaming agent, a surface conditioner, and a surface-active agent can be used, which additives are generally used in the protective layer to improve workability, or external appearance.

Further, a barrier layer incorporating $SiO_2$ may be arranged on the light source side of the protective layer in contact with the protective layer. The barrier layer will be described later. By arrangement of the barrier layer incorporating $SiO_2$ on the light source side of the protective layer in contact with the protective layer, gas barrier properties, and moisture vapor proofing properties against various gasses and water, respectively, which will enter from the back side of the film mirror.

With the above barrier layer, the thickness of the protective layer can be reduced, whereby it becomes possible to decrease the total thickness of the film mirror. The thickness of the protective layer relating to the present invention is preferably 30 to 600 μm.

The film mirror relating to the present invention preferably contains a barrier layer, and a hard coat layer. The barrier layer is preferably disposed between the ultraviolet ray reflection film and the plastic film layer. The hard coat layer is preferably disposed on the light source side of the ultraviolet ray reflection film. The barrier layer and the hard coat layer will be described below.

[Barrier Layer]

The barrier layer relating to the present invention is a layer exhibiting gas barrier properties and moisture vapor proofing properties. The barrier layer is preferably disposed between the ultraviolet ray reflection film and the plastic film layer. Since the barrier layer can reduce the transmittance of oxygen or moisture vapor, the degradation of the plastic layer caused by oxygen or moisture vapor can be suppressed. Further, the barrier layer may be arranged on the light source side of the protective layer in contact with the protective layer. The barrier layer preferably exhibits the larger surface hardness than that of the protective layer.

The barrier layer preferably exhibits the oxygen transmittance of 0.01 ml/m$^2$/day/MPa or less, and the moisture vapor transmittance of 0.001 g/m$^2$/day or less. By allowing the oxygen transmittance and the moisture vapor transmittance in the above ranges, the transmittance of oxygen and moisture vapor entering into the interior of the mirror can be reduced, whereby degradation of the plastic film layer and the metal reflection-layer caused by oxygen or moisture vapor is suppressed. The oxygen transmittance and the moisture vapor transmittance are determined according to JIS K7129 B method.

In case where the film mirror has a barrier layer exhibiting oxygen transmittance of 0.01 ml/m$^2$/day/MPa or less, and moisture vapor transmittance of 0.001 g/m$^2$/day or less, between above described ultraviolet ray reflection film and above described plastic film layer, the total τ of an internal stress of the above described ultraviolet ray reflection film and the aforesaid barrier layer is preferably 0.1 MPa≤τ≤3 MPa. This can reduce generation of a warp in the film mirror.

Usable compound in the barrier layer is, but is not particularly limited to, at least one compound of an oxide, a nitride, and a nitride oxide of at least one element selected from the group consisting of Si, Al, In, Sn, Zn, Ti, Nb, Ce, and Zr. The barrier layer may be formed by the above described compound only, or may contain some other constituents. The barrier layer relating to the present invention may, in particular, preferably use $SiO_2$ or $Al_2O_3$, and by using them, a barrier layer exhibiting a high transparency can be secured. The barrier layer may have a laminated structure formed of two or more layers.

Further, the barrier layer may contain at least one layer of $SiO_2$ layer, SiON layer, and SiN layer, and may be formed so that at least one layer of the above $SiO_2$ layer, above SiON layer, and above SiN layer contains H. The above $SiO_2$ layer, above SiON layer, and above SiN layer may be formed by a single of $SiO_2$, SiON, and SiN, respectively, or may contain some other constituent than above.

Further, the barrier layer may be formed so that it contains a laminated structure in which a SiN layer is formed on a $SiO_2$ layer, and the above $SiO_2$ layer may contain H. The above $SiO_2$ layer and the above SiN layer may be formed by a single of $SiO_2$ and SiN, respectively, or may contain some other constituent than above.

The thickness of the total barrier layers relating to the present invention is preferably in a range of 10 nm to 900 nm, and more preferably 300 nm to 700 nm, but is not particularly limited to them.

[Hard Coat Layer]

The hard coat layer relating to the present invention is a layer which provides the surface of the film mirror with bruise resistance properties. The hard coat layer is preferably disposed on the light source side of the ultraviolet ray reflection film.

The hard coat layer used in the present invention is preferably formed in such a manner, but is not particularly limited to, that a composite is prepared by dissolving a oligomer such as multifunctional acryl monomer, urethane acrylate, and epoxy acrylate, and various polymerization initiators into a solvent; subsequently, to the resulting composite, if needed, an inorganic filler such as silica and alumina is added to prepare a coating composite, which is then coated and dried to remove the solvent, and the resulting film is hardened via heat and/or ionizing radiation to prepare the hard coat layer.

The thickness of the hard coat layer is preferably 1 to 30 μm, more preferably 1 to 20 μm, and most preferably 2 to 15 μm. The hard coat layer preferably exhibits the pencil hardness of 1H or more, more preferably 2H or more, and most preferably 3H or more. The hard coat layer preferably exhibits the refractive index in a range of 1.45 to 2.0, and more preferably in a range of 1.5 to 1.8.

The hard coat layer can be formed by a layer composed of an inorganic compound in which silicone dioxide is the principal ingredient, a layer composed of an organic compound such as a polymer having a saturated hydrocarbon or a polyether as the principal chain, or a layer in which inorganic and organic compounds are hybridized. The layer is particularly preferably composed of a polymer having a saturated hydrocarbon as the principal chain. The polymer is preferably cross-linked. The polymer having a saturated hydrocarbon as the principal chain is preferably obtained by a polymerization reaction of ethylenic unsaturated monomers. In order to obtain a cross-linked binder polymer, a monomer having at least two ethylenic unsaturated groups is preferably used.

Examples of the monomer having at least two ethylenic unsaturated groups include esters between a polyalcohol and a (metha)acrylic acid (for example, ethylene glycol di(metha) acrylate, 1,4-dichrolohexane diacrylate, pentaerythritol tetra (metha)acrylate, pentaerythritol tri(metha)acrylate, trimethylolpropane tri(metha)acrylate, trimethylolethane tri(metha) acrylate, dipentaerythritol tetra(metha)acrylate, dipentaerythritol penta(metha)acrylate, pentaerythritol hexa (metha)acrylate, 1,2,3-cyclohexane tetramethacrylate, polyurethane polyacrylate, and polyester polyacrylate; vinylbenzene and its derivatives (for example, 1,4-divinyl benzene, 4-vinyl benzoic acid-2-acryloylethylester, and 1,4-divinyl cyclohexane; vinyl sulfones (for example, divinyl sulfone); acrylamides (for example, methylenebisacrylamide); and methacrylamide.

The polymer having a polyether as the principal chain is preferably synthesized via a ring-opening polymerization reaction of a polyfunctional epoxy compound.

These monomers having an ethylenic unsaturated group are required to be hardened, after coating, by a polymerization reaction via ionizing radiation or heat.

Instead of or in addition to the monomers having at least two ethylenic unsaturated groups, a crosslinked structure may be incorporated into a binder polymer by a reaction of a crosslinkable group. Examples of the crosslinkable functional groups include isocyanate groups, epoxy groups, aziridine groups, oxazoline groups, aldehyde groups, carbonyl groups, hydrazine groups, carboxyl groups, methylol groups, and active methylene groups. Also, a vinylsulfonic acid, an acid hydride, cyanoacrylate derivatives, a melamine, an etherified methylol, an ester and a urethane, or a metal alkoxide such as tetramethylsilane can be used as a monomer to introduce a crosslinked structure. A functional group exhibiting crosslinking ability as a result of a decomposition reaction such as a blocked isocyanate group may be used. Further, the crosslinkable group is not limited to the above compounds, but may be compounds which exhibit reactivity as a result of decomposition of the above functional groups. The compounds having the above crosslinkable group are required to be crosslinked via means such as heat after they are coated.

Further, inorganic particulates may be added to the hard coat layer in order to regulate the refractive index or enhance the hardening strength of the film. The inorganic particulates preferably have an average particle size of 0.001 to 0.5 μm, and particularly preferably 0.001 to 0.2 μm.

The inorganic particulate include silicon dioxide particles, titanium dioxide particles, aluminum oxide particles, tin oxide particles, calcium carbonate particles, barium sulfate particles, talc, kaolin, and calcium sulfate. Of these, particularly preferable are silicon dioxide particles, titanium dioxide particles, and aluminum oxide particles.

The amount of the inorganic particulates to be added is preferably 10 to 90% by mass with respect to the total mass of the hard coat layer, more preferably 20 to 80% by mass, and particularly preferably 30 to 60% by mass.

The film mirror relating to the present invention may have a sacrificial layer, and an underlayer. The sacrificial layer is preferably disposed between the metal reflection-layer and the protective layer. The underlayer is preferably disposed between the plastic layer and the metal reflection-layer. The sacrificial layer and the underlayer are described below.

[Sacrificial Layer]

The sacrificial layer relating to the present invention is a layer which protects the metal reflection-layer by a function of sacrificial anticorrosion. By disposing the sacrificial layer between the metal reflection-layer and the protective layer, the anticorrosion properties of the metal reflection-layer can be improved.

As the sacrificial layer, metals exhibiting a higher ionization tendency than that of a metal used in the metal reflection-layer can be used, but are not particularly limited to them. In case where silver is used in the metal reflection-layer, cupper or tin, which has a higher ionization tendency than that of silver, or an alloy thereof, can be used in the sacrificial layer. It is designed so that the silver reflection-layer is prevented from corrosion by corrosion of the above metals or an alloy themselves. As the sacrificial layer relating to the present invention, cupper is particularly preferably used.

The sacrificial layer can be formed via film forming methods such as chemical plating. The thickness of the sacrificial layer is preferably 20 to 100 nm. The reason for the thickness of the sacrificial layer being preferably 20 nm or more is that, when the thickness is 20 nm or less, attachment of the sacrificial layer with the metal reflection-layer is likely to becomes inferior, or protection of the metal reflection-layer is likely to becomes insufficient. The reason for the thickness of the sacrificial layer being preferably 100 nm or less is that the film thickness larger than needed results in a large production cost, even though there exist no upper limit of the thickness in view of protection of the metal reflection-layer.

[Underlayer]

The underlayer relating to the present invention is a layer which strengthens close attachment between the plastic film layer and the metal reflection-layer. The underlayer is preferably disposed between the plastic film layer and the metal reflection-layer. With the above disposition, it becomes possible to improve the close attachment between the plastic film layer and the metal reflection-layer.

As the underlayer, silicon dioxide can be used, but the underlayer is not limited to it. Since the silicon dioxide exhibits excellent close attachment with the plastic film layer and with silver, and in addition to that, it contains no elements which have an excellent reactivity with silver, it causes no chemical reaction with the silver reflection-layer.

The thickness of the underlayer is preferably 20 angstrom or more and 100 angstrom or less. In case of less than 20 angstrom, since the underlayer formed on the plastic film layer has an island structure, the underlayer is not formed over a sufficient area. Therefore, the close attachment between the plastic film layer and the metal reflection-layer is not secured. Further, in case where the thickness is over 100 angstrom, internal stress of silicon dioxide becomes large, whereby the underlayer itself is likely to be coming off.

[Layer Structure]

The film mirror relating to the present invention is constituted so that it has an ultraviolet ray reflection film, a plastic film layer, a metal reflection-layer, and a protection layer, and the above layers are arranged in the following order from a light source side: the ultraviolet ray reflection film, the plastic film layer, the metal reflection-layer, and the protection layer.

Further, in addition to the ultraviolet ray reflection film, the plastic film layer, the metal reflection-layer, and the protection layer, the film mirror relating to the present invention may have a hard coat layer, a barrier layer, an underlayer, and a sacrificial layer. The film mirror is preferably constituted so that layers are arranged in the following order from a light source side: the hard coat layer, the ultraviolet ray reflection film, the barrier layer, the plastic film layer, the underlayer, the metal reflection-layer, the sacrificial layer, and the protection layer.

EXAMPLES

The invention is described below with reference to examples, but the invention is not limited to them.

Example 1

Figure 1:
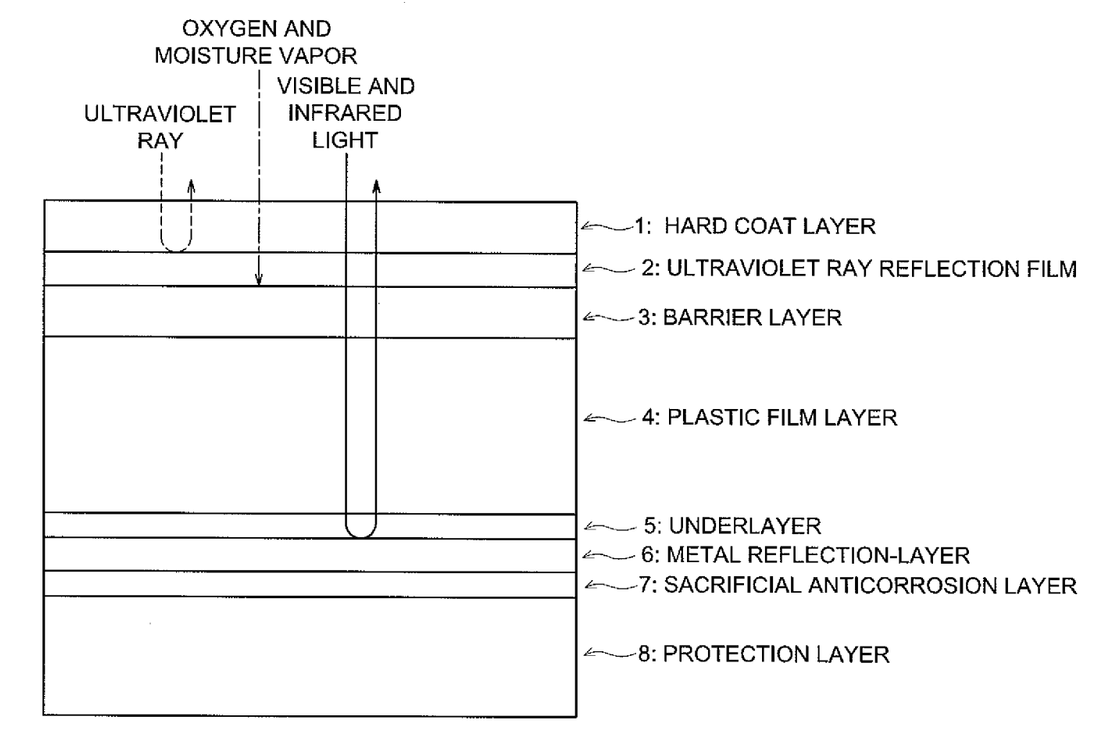
FIG. 1 is a cross-section of the film mirror of the embodiment relating to the present invention.

As shown in FIG. 1, the film mirror of Example 1 is constituted so that layers are arranged in the following order from a light source side: hard coat layer 1, ultraviolet ray reflection film 2, barrier layer 3, plastic film layer 4, underlayer 5, metal reflection-layer 6, sacrificial layer 7, and protection layer 8.

Hard coat layer 1 was produced in the following way. First, a mixture of dipentaerythritol pentaacrylate and dipentaerythritol hexaacrylate (DPHA, manufactured by Nippon Kayaku Co., Ltd.) was dissolved in a mixed solvent of methylethylketone and cyclohexanone. Into the resulting solution, a photopolymerization initiator (IRGACURE 907, manufactured by Ciba Geigy Co.) was added and stirred until the initiator was dissolved. After that, MEK-ST ($SiO_2$ sol; an average particle size: 10 to 20 nm; a solid content concentration: 30% by mass; dispersed in methylethylketone; produced by Nissan Chemical Industries Ltd.) was added and stirred to obtain a mixture, which was then filtered through a polypropylene filter having a pore size of 3 μm (PPE-03) to prepare a coating solution for a hard coat layer.

The above coating solution for a hard coat layer was applied, using a gravure coater, on a dielectric multilayer film which is an ultraviolet ray reflection film, and was dried for two minutes at 100° C. Next, through irradiation of ultraviolet ray, the coated layer was hardened, to form hard coat layer 1 (refractive index: 1.51; film thickness: 6 μm).

Ultraviolet ray reflection film 2 is constituted of a dielectric multilayer film, and is constituted of layers in which a dielectric layer exhibiting a high refractive index and a dielectric layer exhibiting a low refractive index are laminated alternatively in 6 layers. In the present example, $TiO_2$ is used for the dielectric layer exhibiting a high refractive index, and $SiO_2$ is used for the dielectric layer exhibiting a low refractive index. The total thickness of the ultraviolet ray reflection film, which is constituted of layers in which a dielectric layer exhibiting a high refractive index and a dielectric layer exhibiting a low refractive index are laminated alternatively in 6 layers, is 270 nm. Ultraviolet ray reflection film 2 is formed via an atmospheric pressure plasma polymerization method.

Barrier layer 3 is formed by $SiO_2$, and the thickness is 500 nm. Barrier layer 3 is formed via an atmospheric pressure plasma polymerization method.

Plastic film layer 4 is formed by polyethylene terephthalate (PET), and the thickness is 150 μm.

Underlayer 5 is formed by $SiO_2$, and the thickness is 50 angstrom.

Metal reflection-layer 6 is formed by Ag. Underlayer 5 was formed on a polyethylene terephthalate (PET) which was a plastic film layer, after which, under nitrogen atmosphere in order to prevent oxidation, a silver-plating solution was applied by spraying to a dry film thickness of 200 nm, to form a metal reflection-layer (a silver reflection-layer) via the silver mirror reaction. In the present example, via the non-electrolysis silver mirror reaction in which a silver plating solution containing an ammoniacal silver nitrate aqueous solution is reduced by glucose, silver is deposited on the surface of an underlayer which is on a plastic film layer, to form a silver reflection-layer. As the silver plating solution, an ammoniacal silver nitrate aqueous solution $AgNO_3$, a sodium hydroxide aqueous solution NaOH, and a glucose aqueous solution $C_6H_{12}O_6$ were used.

Sacrificial layer 7 is formed by Cu. On Ag which is a metal reflection-layer, under nitrogen atmosphere in order to prevent oxidation, a cupper-plating solution was applied by spraying to a dry film thickness of 100 nm, to form sacrificial layer 7 of cupper.

Protection layer 8 is formed by a binder and a pigment, and the binder is constituted of an epoxy resin and a hardener. In the present example, a bisphenol F type epoxy resin as the epoxy resin, and an aromatic amine type hardener as the hardener, are used. The pigment is a blending of a body pigment, a coloring pigment, and a rust-preventive pigment. Calcium carbonate, titanium oxide, and zinc oxide are used for the body pigment, for the coloring pigment, and for the rust-preventive pigment, respectively. Protection layer 8 is produced by conducting a coating on Cu, which is the sacrificial layer, via a flow coater method to a dry film thickness of 500 μm.

Example 2

A film mirror was produced in the same manner as Example 1 except that ultraviolet ray reflection film 2 was formed by laminating a dielectric layer ($TiO_2$) exhibiting a high refractive index and a dielectric layer ($SiO_2$) exhibiting a low refractive index alternatively in 2 layers.

Example 3

A film mirror was produced in the same manner as Example 1 except that ultraviolet ray reflection film 2 was formed by laminating a dielectric layer (TiO$_2$) exhibiting a high refractive index and a dielectric layer (SiO$_2$) exhibiting a low refractive index alternatively in 10 layers.

Example 4

A film mirror was produced in the same manner as Example 1 except that ultraviolet ray reflection film 2 and barrier layer 3 were formed via a vacuum sputtering method in place of an atmospheric pressure plasma polymerization method.

Example 5

A film mirror was produced in the same manner as Example 1 except that the film mirror has no sacrificial layer 7.

Comparative Example 1

A film mirror was produced in the same manner as Example 1 except that the film mirror has no ultraviolet ray reflection film 2.

Evaluation methods of each characteristic of film mirrors obtained in each of the examples and the comparative example are shown below.

(Reflectance Test)

The reflectance of a film mirror was determined using a gloss meter (manufactured by Konica Minolta; product name: GM-60) after the film mirror was irradiated by a xenon lamp for 200 hours under conditions of 70° C. and 80% RH and before the irradiation. From reflectance data of the film mirror before and after the irradiation by a xenon lamp, a rate of decrease in reflectance before and after the irradiation by a xenon lamp was calculated. In the above determination, the larger the value obtained by the measurement using the gloss meter, the larger the reflectance of light by a film mirror. The evaluation criteria of the reflectance test are described below.

A: The rate of decrease in reflectance is less than 10%.
B: The rate of decrease in reflectance is 10% or more and less than 20%.
C: The rate of decrease in reflectance is 20% or more.

(Film Attachment Test)

A film attachment test was carried out via a peel test using a cellophane adhesive tape (2 cm×2 cm) after each film mirror was kept in a thermostat chamber of 40° C. and 95% RH for 200 hours. 25 cells of 2 mm×2 mm were made based on JIS K5400, Part 85.2, a grid tape method, and then a vertical peel test was carried out using a cellophane adhesive tape (JIS Z1522). The evaluation criteria of the film attachment test are described below.

A: Detachment of less then 16% is observed.
B: Detachment of 16% or more and less than 40% is observed.
C: Detachment of 40% or more and less than 60% is observed.
D: Detachment of over 60% is observed.

Table 1 shows evaluation results on film mirrors produced in each of examples and the comparative example.

TABLE 1

|  | Reflectance test | Film attachment test |
| --- | --- | --- |
| Example 1 | A | A |
| Example 2 | B | A |
| Example 3 | A | B |
| Example 4 | A | C |
| Example 5 | B | A |
| Comparative example 1 | D | D |

As shown in above Table 1, it was found that in the film mirrors of Examples 1 to 5, which have ultraviolet ray reflection film 2, even after the films were irradiated by a xenon lamp, the decrease in reflectance was suppressed, and the high reflectance property was maintained. On the other hand, in the film mirror of Comparative example 1, which has no ultraviolet ray reflection film 2, the decrease in reflectance was observed after the film was irradiated by a xenon lamp.

It is found that the film mirrors of Examples 1, 3, and 4 are preferable examples, in which decrease in rate of reflectance is largely suppressed, because, in forming ultraviolet ray reflection film 2, they are laminated alternatively, in 6 or 10 layers, with a dielectric layer exhibiting a high refractive index and a dielectric layer exhibiting a low refractive index, and in addition to that, they have the sacrificial layer.

It is found that film mirrors of Examples 1, 2, and 5, exhibit an excellent film attachment, because, in forming ultraviolet ray reflection film 2, they are laminated alternatively, in 2 or 6 layers, with a dielectric layer exhibiting a high refractive index and a dielectric layer exhibiting a low refractive index, and in addition to that, ultraviolet ray reflection film 2 and barrier layer 3 are formed via an atmospheric pressure plasma polymerization method.

The invention claimed is:

1. A film mirror used for reflection of sunlight comprising, in the following order from the side where sunlight is entered, an ultraviolet ray reflection film which reflects ultraviolet ray and transmits visible and infrared light, a plastic film layer, a metal reflection-layer which reflects visible and infrared light, and a protective layer, and
    the film mirror has a barrier layer between the ultraviolet ray reflection film and the plastic film layer, whose barrier layer exhibits oxygen transmittance of 0.01 ml/m$^2$/day/MPa or less, and moisture vapor transmittance of 0.001 g/m$^2$/day or less.

2. The film mirror of claim 1, wherein the thickness T of the plastic film layer is 10 μm≦T≦300 μm.

3. The film mirror of claim 1, wherein the ultraviolet ray reflection film is constituted of dielectric multi-layers.

4. The film mirror of claim 3, wherein the dielectric multi-layers has a constitution that the dielectric multi-layers are laminated alternatively, in 4 layers or more and 6 layers or less, with a dielectric layer exhibiting a high refractive index and a dielectric layer exhibiting a low refractive index.

5. The film mirror of claim 1, wherein the ratio of the total thickness of the ultraviolet ray reflection film and the barrier layer with respect to the thickness of the plastic film layer is 0.1 to 1.0%.

6. The film mirror of claim 1, wherein, between the ultraviolet ray reflection film which is constituted of dielectric multi-layers which are laminated alternatively, in 4 layers or more and 6 layers or less, with a dielectric layer exhibiting a high refractive index and a dielectric layer exhibiting a low refractive index, and the plastic layer, the film mirror has a barrier layer exhibiting oxygen transmittance of 0.01 ml/m$^2$/day/MPa or less and moisture vapor transmittance of 0.001 g/m$^2$/day or less, and, in addition, the barrier layer doubles as the dielectric layer exhibiting a low refractive index of the ultraviolet ray reflection film.

7. The film mirror of claim 1, wherein, between the ultraviolet ray reflection film and the plastic layer, the film mirror has a barrier layer exhibiting oxygen transmittance of 0.01 ml/m$^2$/day/MPa or less, and moisture vapor transmittance of 0.001 g/m$^2$/day or less, and the ultraviolet ray reflection film and/or the barrier layer are formed via an atmospheric pressure plasma polymerization method.

8. The film mirror of claim 1, wherein, between the ultraviolet ray reflection film and the plastic layer, the film mirror has a barrier layer exhibiting oxygen transmittance of 0.01 ml/m$^2$/day/MPa or less and moisture vapor transmittance of 0.001 g/m$^2$/day or less, and the total τ of an internal stress of the ultraviolet ray reflection film and the barrier layer is 0.1 MPa≦τ≦3 MPa.

9. The film mirror of claim 1, wherein the metal reflection-layer is constituted of silver.

10. The film mirror of claim 1, wherein the film mirror is used outdoors.

11. The film mirror of claim 1, wherein an average reflectance for electromagnetic wave of 320 to 400 nm of the ultraviolet ray reflection film of 75% or more.

12. The film mirror of claim 1, wherein the ultraviolet ray reflection film comprises alternating layers of more than two kinds of dielectric substance differing in refractive index.

13. The film mirror of claim 12, wherein the ultraviolet ray reflection film comprises a high refractive index dielectric layer exhibiting a high refractive index of 2.0 to 2.6 and a low refractive index refractive index dielectric layer exhibiting a low refractive index of 1.8 or less.

14. The film mirror of claim 13, wherein the high refractive index dielectric layer comprises $ZrO_2$ or $TiO_2$.

15. The film mirror of claim 13, wherein the low refractive index refractive index dielectric layer comprises $SiO_2$ or $Al_2O_3$.

16. The film mirror of claim 1, wherein the plastic film layer is composed of a polyester, polyethylene naphthalate, polycarbonate, polyolefin, cellulose derivative, vinyl type, polyimides, polyamide, polyethersulfone, polysulfone type, polyarylate type or fluorine type resin.

17. The film mirror of claim 16, wherein the plastic film layer is composed of a polyethylene terephthalate or cycloolefin polymer.

* * * * *